July 15, 1952        P. D. MERRILL        2,603,017

FILM HOLDER

Filed Dec. 6, 1948

INVENTOR.
PATTERSON D. MERRILL.
BY
Oltsch + Knoblock

ATTORNEYS.

Patented July 15, 1952

2,603,017

UNITED STATES PATENT OFFICE 2,603,017

FILM HOLDER

Patterson Davy Merrill, South Bend, Ind.

Application December 6, 1948, Serial No. 63,700

5 Claims. (Cl. 40—152)

This invention relates to improvements in film holders, and more particularly to a holder for films of the type commonly known as color transparencies, which are mounted in a projector to be viewed.

The primary object of this invention is to provide an inexpensive film holder in which films may be mounted easily and quickly to be fully protected, which is small in size, thin in cross-section, and light in weight.

A further object is to provide a film holder of this character which is dustproof and which is characterized by continuous seals at the locking joint between the sections thereof and at the inner perimeter of both sides thereof.

A further object is to provide a device of this character which is resilient and which frictionally grips a pair of transparent plates between which a film is mounted so that said plates and film will not slide in the holder.

A further object is to provide a film holder of this character having inner marginal gripping portions or jaws, normally of substantially frusto-pyramidal form and flexible to compensate and accommodate differences in thickness of the film and protective glass plates interposed therebetween.

A further object is to provide a device of this character which is formed of two separatable parts resiliently interlocked, whose confronting faces at their margin outwardly of said interlock are spaced apart to facilitate insertion of a knife or other edged member which may be used to effect separation of the parts.

Other objects will be apparent from the following specification.

Figure 1:
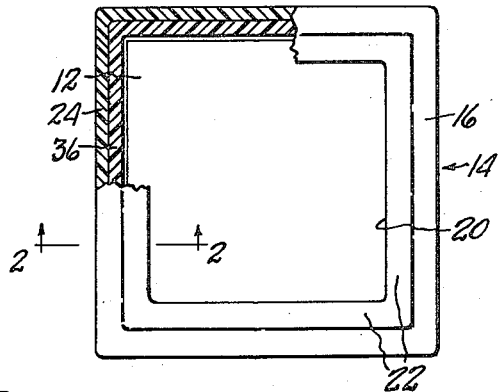
Fig. 1 is a face view of the film holder with parts thereof broken away, taken on line 1—1 of Fig. 3.

Referring to the drawing which illustrates the preferred embodiment of the invention, the numeral 10 designates a film, such as a color transparency to be mounted in the film holder, and the numeral 12 designates glass plates or panels positioned upon opposite sides of and in face engagement with the film 10. The numeral 14 designates my improved film holder. This improved film holder is preferably formed of a synthetic resin, such as cellulose acetate, styrene, vinyl chloride, acrylic or the like. It will be understood that the resins enumerated herein cited are illustrative of the resins which may be employed and that any other resin found suitable may be used.

The film holder comprises two parts in the nature of rim members and identified respectively by the numerals 16 and 18. Both of these rim members are molded from suitable synthetic resin material and are preferably of rectangular shape although they may be fabricated in any other shape found suitable. The rim parts 16 and 18 are preferably of the same size and shape in outline and preferably have the same inner perimetral dimension so that a sight opening 20 is provided through which light from a projector (not shown) may pass to throw the image borne by the film upon a screen in a manner well understood in the art.

The rim member 16 has an inner marginal flange 22 of inwardly tapering cross-sectional shape and of reduced thickness to render the same more flexible than the remaining portions of said rim member. The inner flange portion 22 is of substantially frusto-pyramidal form and inclined inwardly at a slight angle relative to the plane of the member 16. The flange portion 22 extends continuously at the inner margin of the member 16 and its width is substantially one-half the width of said member 16. At its outer margin the member 16 has a continuous perpendicularly inwardly projecting thickened flange portion 24, here shown as of a width substantially one-quarter of the width of the member 16 and of a depth greater than the spacing of the inner edge of the flange 22 from the outer surface of the member 16. The inner face of the flange portion 24 has a shallow rib 26 formed therein adjacent its free edge and preferably defined by an outer face portion 28 and an inner face portion 30, which face portions converge, and each of which extends at an angle of substantially 30 degrees from the remaining inner face portions 32 of the flange 24. The width of the rib 26 is less than one-half the depth of said flange. The part 16 is preferably molded so that its flanges 22 and 24 and its rib 26 are formed integrally.

The rim member 18 has an inner marginal flange 34 of substantially the same size, shape and construction as the flange 22 of the member 16. A laterally inwardly projecting thickened flange portion 36 of substantially rectangular cross-section extends continuously around the rim member 18. The outer perimetral dimension of the flange 36 is of smaller dimension than the inner perimetral dimension of the flange 24 so as to fit freely within said flange. The inner perimetral dimension of the flange portion 36 is greater than the outer perimetral dimension of the film 10 and the plates 12, which latter are of substantially larger dimension than the dimension of the sight opening 20. The outer marginal portion 38 of the part 18 is of substantially the same thickness as the flange 24 of the member 16, but portion 38 may be omitted if desired. The outer surface of the flange portion 36 includes an inclined surface 40 complementary to the surface 28 of the member 16, and a second inclined surface 42 complementary to the surface 30 of the member 16. These two inclined surfaces 40 and 42 cooperate to define a perimetral rib 44 extending around the outer surface of the flange 36. The perimetral dimension of the rib 44 at its crest between the inclined surfaces 40 and 42 thereof is substantially equal to the perimetral dimension of the inner face 32 of the flange 24 of the member 16. The faces 28, 30 and 42 are preferably of substantially the same length and the face 40 is of greater length, whereby the free or outer end of the flange 36 may pass into the member 16 clear of the rib 26. The rib 44 is formed intermediate the depth of the flange 36.

Figure 2:
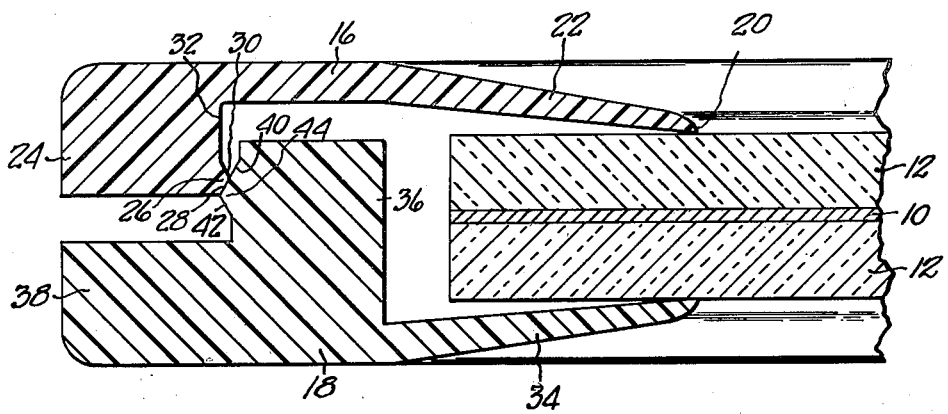
Fig. 2 is an enlarged sectional view taken on line 2—2 of Fig. 1, and illustrating the parts in their operative assembled position preparatory to interlocking thereof.
Figure 3:
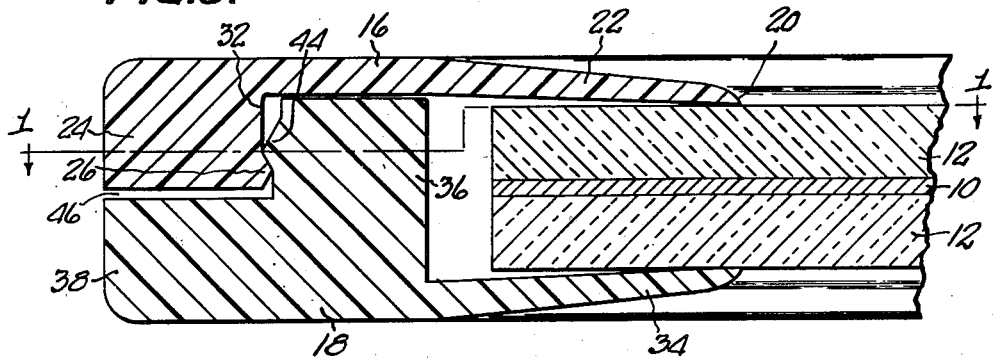
Fig. 3 is a view similar to Fig. 2 and illustrating the parts of the film holder in operative interlocked position.

In the use of the device the film 10 is positioned between the glass or other transparent plates 12 and this assembly is then inserted into the pocket of the member 18 defined by the flange 36. The member 16 is then applied over the member 18 to the position illustrated in Fig. 2. The ribs 26 and 44 are so positioned with respect to the depth of the inner marginal flanges 22 and 34 that the inner edges of said flanges will bear against the outer faces of the transparent plates 12 when the faces 28 and 40 come into engagement. Thereupon the parts 16 and 18 are pressed together, causing the rib 26 of the member 16 to slide over the rib 44 and to anchor therebehind in the position illustrated in Fig. 3, with the surface 30 of the rib 26 in continuous face engagement with the surface 42 of the rib 44. The member 16, being formed of a plastic material having at least a measure of resilience in the thin sections employed in this device, has a spring action accommodating the interlocking of the ribs 26 and 44 as shown, and also accommodating flexing of the inner marginal flanges 22 and 34 to the position illustrated in Fig. 3 in which the inner edges of said flanges 22 and 34 have continuous engagement with the outer surfaces of the transparent plates 12. The flexing of the inner marginal flanges 22 and 34 distorts said flanges slightly, and, by reason of the resilient character of the material, a firm spring grip occurs acting in a manner to separate the two parts 16 and 18 but being prevented from separating said parts by the face engagement of the ribs 26 and 44. This spring action serves to hold the faces 28 and 42 in continuous firm face engagement, thus constituting a dust seal at the outer margin or joint between the two parts 16 and 18. The parts are preferably so constructed that when they are interlocked, as illustrated in Fig. 3, a slit or opening 46 is provided between the confronting surfaces of the flange 24 of the member 16 and the part 38 of the member 18. This slit is of very small dimension but is sufficient to permit the insertion therein of a blade which can be manipulated by turning the same about its longitudinal axis at an inclination to the planes of said confronting surfaces and to an extent to facilitate the release of the interlocking engagement between the ribs 26 and 44.

As an illustration of the dimension of the parts, the thickness of the flange 24 of member 16 and of the part 38 of the member 18 is approximately one-sixteenth ($\frac{1}{16}$) of an inch; the thickness of the part 18 at the flange 36 is approximately .107 inch; and the thickness of the flanges 22 and 34 adjacent their inner edges is approximately .01 inch. The height of each of the ribs 26 and 44 from the surfaces from which they project is approximately .005 inch. The total clearance between the face 32 of the flange 24 and the outer face of the flange 36 outwardly of the rib 44 is approximately .01 inch. The major dimension or length of the holder is approximately two and three-quarters ($2\frac{3}{4}$) inches, and the sight opening at the major dimension of the device is approximately two and one-eighth ($2\frac{1}{8}$) inches. The total over-all width of each of the rim members between their outer marginal edges and the inner edge defining the sight opening 20 is approximately five-sixteenths ($\frac{5}{16}$) of an inch. These dimensions are cited for purposes of illustration only, and it is understood they are not limiting.

It will be apparent from the foregoing that a continuous perimetral dustproof seal is afforded between the ribs 26 and 44, and between the inner edges of each of the flanges 22 and 34 and the plate 12 engaged thereby. Consequently, there is no possibility that any dust or dirt can accumulate within the holder or contact the film 10. The friction grip afforded by the resilience of the flanges 22 and 34 holds the lock at the ribs 26 and 44 effective at all times and imparts sufficient pressure upon the plates 12 to insure that neither said plates nor the film 10 may slip or be displaced from its proper position. If any irregularities in the thickness of the glass plates occur, the flexibility of the ribs 22 and 34 is sufficient to compensate for them and at the same time maintain the continuous dust-tight engagement. These features combined produce a holder which meets satisfactorily all conditions and requirements of use of such a film holder, it being observed that the film holder protects the outer surfaces of the glass 12 as well as the film 10 by reason of the inset position of the surfaces of said plates relative to the planes of the outer surfaces of the parts 16 and 18. The device is light in weight and, by reason of its molded form, can be produced inexpensively.

While the preferred construction of the device has been illustrated and described herein, it will be understood that changes may be made therein within the scope of the appended claims without departing from the spirit of the invention.

I claim:

1. A film holder adapted to mount a pair of transparent panels and a film interposed therebetween, comprising a pair of substantially flat resilient plastic parts of substantially the same perimetral dimension and each having a central sight opening, one of said parts having an integral laterally projecting flange extending continuously at its outer margin, the other part having a continuous integral laterally projecting flange spaced from its outer margin a distance greater than the thickness of said first flange, perimetral ribs formed integrally on said flanges respectively at the inner perimeter of said first flange and at the outer perimeter of said second flange, said ribs being of such dimension and location as to interengage with a snap action to continuously lock said parts together, the inner marginal portion of each part being of reduced thickness and inclined inwardly relative to the plane of said part and adapted to be flexed to continuously grip said panels and film therebetween.

2. The construction defined in claim 1, wherein said ribs are defined by complementary angularly disposed converging faces with one thereof bearing flat against a face of the other rib when said parts are interlocked.

3. A film holder adapted to mount a film interposed between transparent plates, comprising a pair of substantially flat rectangular plastic rim members having similar central openings smaller than said plates, each rim member having an inner marginal portion of reduced thickness and frusto-pyramidal form, the outer marginal portion of one rim member having a thickened flange whose inner face has a continuous perimetral rib adjacent its free edge, the other rim member having a thickened flange fitting with clearance within the first marginal flange and whose outer face has a continuous perimetral rib spaced from its base, the perimetral dimension of the crest of said first named rib being slightly less than the perimetral dimension of the crest of said last named rib to accommodate interlocking of said rim members at said ribs with a snap action, said ribs being so positioned relative to the planes of the edges of said frusto-pyramidal portions as to flex said frusto-pyramidal portions outwardly when said rim members are interlocked with said film and plates interposed therebetween, whereby said ribs are held in continuous sealing engagement and each frusto-pyramidal portion is held in continuous sealing engagement with one of said plates.

4. The construction defined in claim 3, wherein said ribs have complementary flat frusto-pyramidal sealing face portions, the confronting surfaces at the outer margins of said rim members being slightly spaced when said last named face portions are in interlocked sealing engagement.

5. A film holder comprising a pair of parts adapted to clamp therebetween an insert including a film and a transparent plate in face engagement, said parts having central openings smaller than said insert, telescopically interfitting perimetral flanges carried by said parts, the outer perimetral dimension of said telescoped flange being smaller at its mouth than the inner perimetral dimension of said telescoping flange at its mouth whereby said parts interfit loosely when initially applied together, a perimetral internal ridge carried by said telescoping flange adjacent to its mouth and defined in part by a tapered surface facing its mouth, and a perimetral external ridge carried by said telescoped flange intermediate its width and defined in part by a tapered surface facing its mouth, the major perimetral dimension of said last named ridge being slightly less than the smallest perimetral dimension of said first named ridge, whereby said ridges pilot said parts into register upon interengagement of said tapered surfaces and interlock with a snap action when said ridges are pressed past each other.

PATTERSON DAVY MERRILL.

REFERENCES CITED

The following references are of record in the file of this patent:

UNITED STATES PATENTS

| Number | Name | Date |
|---|---|---|
| 1,394,675 | Frechette | Oct. 25, 1921 |
| 2,176,283 | Whiteford | Oct. 17, 1939 |
| 2,186,643 | Kaplan | Jan. 9, 1940 |
| 2,292,312 | Wittel et al. | Aug. 4, 1942 |